(12) United States Patent
Chen et al.

(10) Patent No.: US 6,434,514 B1
(45) Date of Patent: Aug. 13, 2002

(54) RULE BASED CAPACITY MANAGEMENT SYSTEM FOR AN INTER OFFICE FACILITY

(75) Inventors: Chuxin Chen; Ralph Gnauck, both of San Francisco; George T. Noll, Escondido, all of CA (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/687,635

(22) Filed: Oct. 13, 2000

(51) Int. Cl.[7] ............................................... G06F 11/30
(52) U.S. Cl. ...................................... 702/188; 707/104
(58) Field of Search .......................... 702/62, 188, 122, 702/182–186, FOR 103–104, 134–135, FOR 155, 170, 171; 707/104.1, 103; 714/47; 706/45; 709/203, 100, 225

(56) References Cited

U.S. PATENT DOCUMENTS 5,678,042 A * 10/1997 Pisello et al. ................. 714/47
5,687,290 A * 11/1997 Lewis ........................... 706/45
5,799,317 A * 8/1998 He et al. .................. 707/104.1

* cited by examiner

*Primary Examiner*—John S. Hilten
*Assistant Examiner*—Xiuqin Sun
(74) *Attorney, Agent, or Firm*—Haynes and Boone, LLP (57) ABSTRACT

A rule based capacity management system for an inter office facility is provided. The system includes a presentation layer for providing a graphical user interface to a user. The presentation layer is capable of receiving one or more rules from the user and for providing one or more analytical reports of the equipment based on the rules. The system also includes a data layer for storing rules, including the rules received from the user, and for connecting to an inventory system such as trunks integrated record keeping system (TIRKS). The system also includes a business layer interfacing between the presentation layer and the data layer. The business layer creates the analytical reports responsive to the rules and the raw data.

23 Claims, 9 Drawing Sheets

Forecast & Pending Jobs [CRLS12DC0-5E M&S ALL T]

File  Help

LOCATION: CRLSCA12DC0　　　TECHNOLOGY: Sw5EMsg-SS　　　GROUP TYPE: DS1

Forecasts

| Status | Tech Code | Date | Quanity | Description | Owner | |
|---|---|---|---|---|---|---|
| Unused | E5MD150A | 2000/1 | 23 | Quarter| GTF: 199912 | rcharts | GTF |
| Unused | E5MD150A | 2000/01 | 23 | Quarter| GTF: 199912 | rcharts | |
| Used by Others | E5MD150A | 2000/12 | 136 | Quarter| GTF: 200012 | System | Include |
| Used by Others | E5MD150A | 2000/09 | 45 | Quarter| GTF: 200009 | System | |
| Used by Others | E5MD150A | 2000/06 | 21 | Quarter| GTF: 200006 | System | Insert |
| Used by Others | E5MD150A | 2000/03 | 21 | Quarter| GTF: 200003 | System | |
| Used by Others | E5MD150A | 2001/12 | 53 | Quarter| GTF: 200112 | System | Delete |
| Used by Others | E5MD150A | 2001/09 | 53 | Quarter| GTF: 200109 | System | |
| Used by Others | E5MD150A | 2001/06 | 53 | Quarter| GTF: 200106 | System | |

Pending Jobs

| Status | Tech Code | RFS Date | Capacity | Job No. | Job Status | Job Description | Owner | |
|---|---|---|---|---|---|---|---|---|
| Unused | E5MD150A | 1999/12 | 112 | 08144950 | Pending | TRUNKS | rcharts | Import ME |
| Unused | E5MD150A | 1999/12 | 112 | 08144950 | Pending | TRUNKS | rcharts | Include |
| | | | | | | | | Insert |
| | | | | | | | | Delete |

RULE BASED CAPACITY MANAGEMENT SYSTEM FOR AN INTER OFFICE FACILITY

BACKGROUND

The present invention relates generally to monitoring systems and more particularly, to a system and method for monitoring and analyzing one or more pieces of telecommunication network equipment via a rule based system.

It is often desired to monitor specific pieces of equipment of a telecommunication network. Traditionally, the monitoring has been provided in a flat-file, data dump format. For example, a conventional monitoring system can show if a piece of equipment in a network is up or down.

However, it is often desired to have a deeper analysis of the equipment. Consider for example an inter-office facility, or "IOF". An IOF can generically represent any node (or group of nodes) in a telecommunication network, and more specifically identifies one or more pieces of equipment used to interconnect various links or nodes, such as other networks, telephone lines, and/or trunks.

One way to monitor equipment in an IOF is to use a system called the Trunks Integrated Record Keeping System ("TIRKS"). TIRKS is commonly used to help a regional bell operating company ("RBOC") determine if facilities exist to provide service, track order completion, fulfill circuit orders, and perform inventory planning.

Although TIRKS provides a great detail of information, the method of acquiring the information is very long and tedious. For example, in order to review equipment of an IOF, many steps must be performed on TIRKS. The information provided by TIRKS is in a raw-data format, and must be manually complied into a tabular form to represent the desired information (e.g., exhaust conditions of one or more pieces of equipment). If there is an exhaust condition, a new job must be created for TIRKS, and a job story must be manually created to satisfy various RBOC reporting requirements.

What is desired is a system and method that automatically monitors one or more pieces of equipment, analyzes the pieces of equipment, and creates review and/or reports from the analysis.

DETAILED DESCRIPTION

The present disclosure relates to capacity management systems, such as can be used in an inter-office facility or a central office (hereinafter inter-office facility, or "IOF"). It is understood, however, that the following disclosure provides many different embodiments, or examples, for implementing different features of the invention. Specific examples of equipment, connections, and arrangements are described below to simplify the present disclosure. These are, of course, merely examples and are not intended to limit the invention from that described in the claims.

The following disclosure is divided into three different sections. First of all, an exemplary network and system is provided. The exemplary network identifies two telecommunication networks that may benefit from the present invention, and the exemplary system provides an example of a system for providing a graphical user interface for monitoring a specific node of either or both of the networks. Secondly, an exemplary software routine is discussed for implementing one embodiment of the graphical user interface. Thirdly, a plurality of screen shots are provided for illustrating the graphical user interface.

Exemplary Network and System

Figure 1:
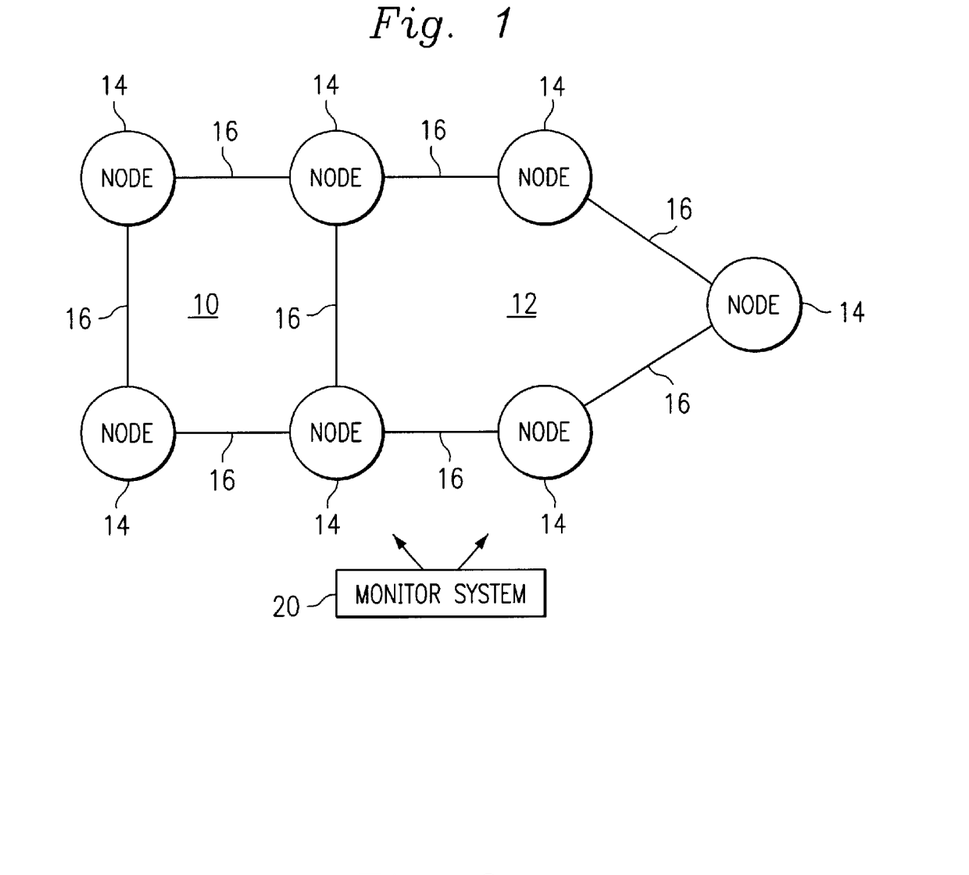
FIG. 1 is a simplified description of several typical telecommunication networks and a monitor system according to one or more embodiments of the present invention.

Referring to FIG. 1, the reference numerals 10 and 12 designate, in general, two simplified networks. The networks 10, 12 include a plurality of nodes 14 and a plurality of links 16. A node is a point of connection in a network, and can be of any size. For example, an IOF is a node of a telecommunications network. Likewise, the IOF may include many different pieces of equipment (e.g., switches), each of which may also be considered a node of the network.

In the illustration of FIG. 1, some of the nodes exist in both networks 10, 12, and are therefore considered hubs. In the present example, each node includes a plurality of terminations where a service enters or exits the network 10, 12. In continuance of the example, the nodes 14 are IOF's and the links 16 are various types of trunks.

Figure 2:
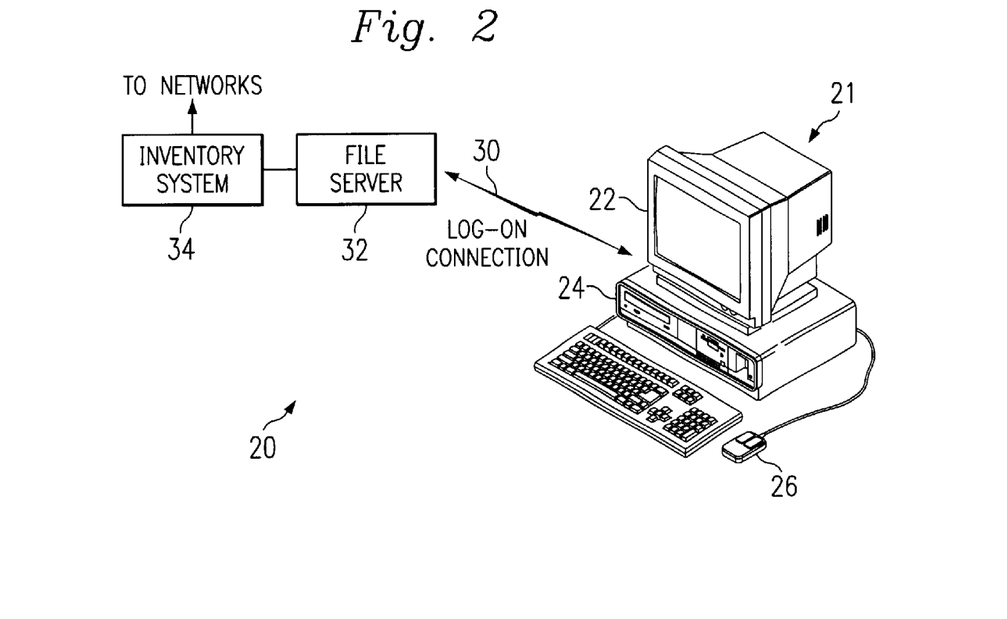
FIG. 2 illustrates one embodiment of the monitoring system of FIG. 1.

Referring also to FIG. 2, a monitoring system 20 may be connected to one or more nodes of the networks 10, 12 for monitoring one or more pieces of equipment of the nodes. In one embodiment, the monitoring system 20 includes a personal computer 21 with a graphics display 22, a control unit 24, and user inputs 26 such as a keyboard and pointer device. The computer 21 is connected through a log-on connection 30 to a file server 32, which also includes hardware equipment found in a typical server computer. The file server 32 is further connected to an inventory system 34, such as the TIRKS system discussed above. It is well known by those of ordinary skill in the art that various implementations can exist for the monitoring system 20. For example, in some implementations, the monitoring system 20 may include a larger, mainframe-type computer that is either locally or remotely accessible by a terminal or personal computer. In other implementations, the monitoring system 20 may include a series of computers. In still other implementations, the monitoring system may include or utilize a series of adjunct processors to one or more of the nodes 14.

The monitoring system 20 can perform various software routines that can produce a series of graphical output images. The images are arranged in a unique way to illustrate the status of a particular node in the network 10. For example, the images can be used by network engineers to analyze one or more particular pieces of equipment at the node. The images can also identify exhaust conditions that may occur. The images are produced by a unique software program, discussed below, and may appear on the graphics display 22.

Figures 3, 4, 5, 6:
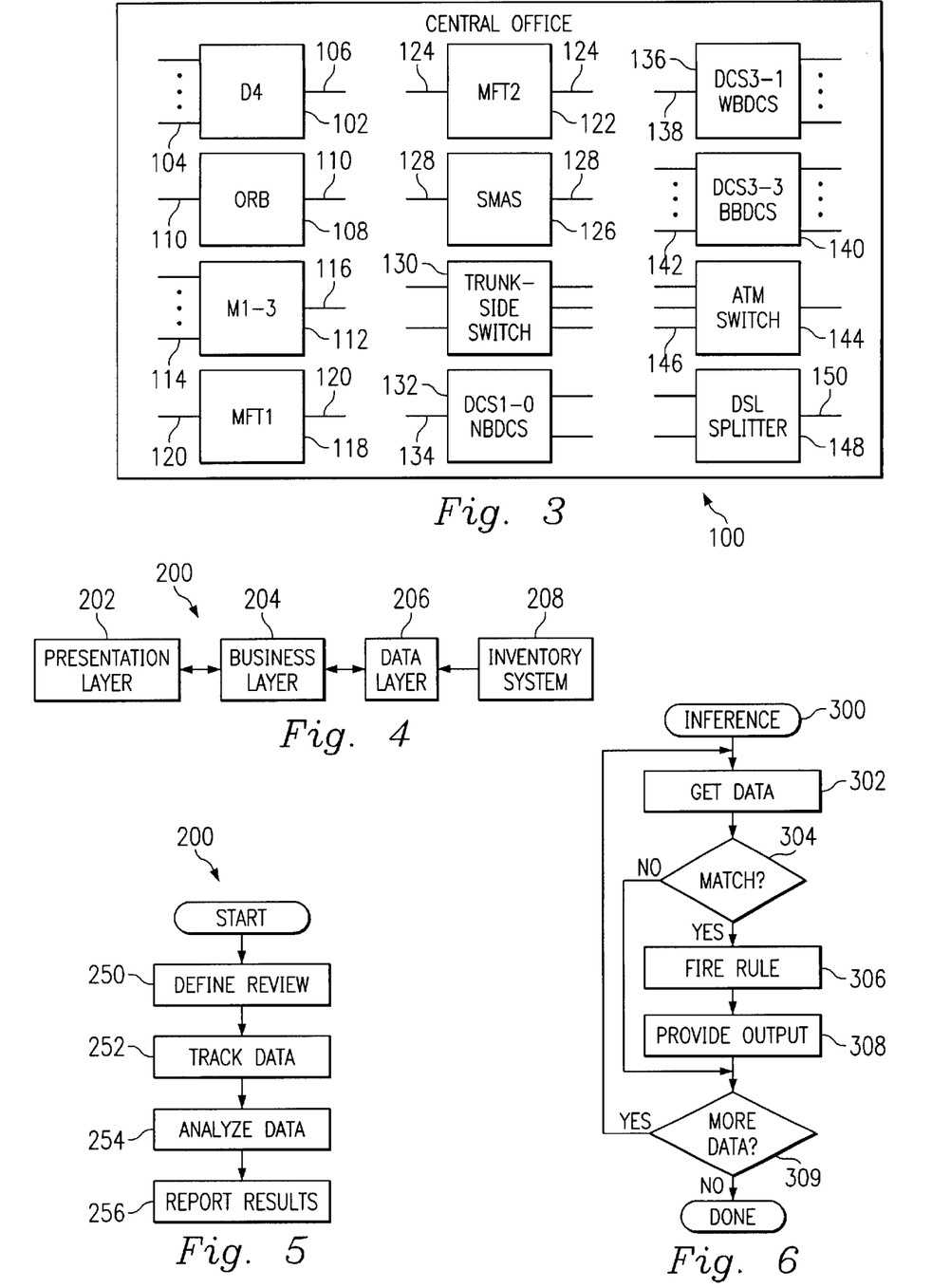
FIG. 3 is a block diagram of an exemplary inter-office facility including several different pieces of equipment, which the present embodiment may monitor.
FIGS. 4–5 provide a simplified diagram and flow chart that illustrates one embodiment of a software program for implementing features of the present invention.
FIG. 6 is a flow chart that illustrates one embodiment of an inference engine for the software program of FIGS. 4–5.

Referring now to FIG. 3, for the sake of example, one node 14 of the network 10 or 12 may be an IOF 100, as illustrated. It is understood, however, that the illustrated IOF of FIG. 3 is simplified for the sake of clarity, and many different configurations are well known in the art.

The IOF 100 includes many different pieces of equipment that a network engineer may desire to review. In the present example, the IOF includes one or more pieces of equipment described in Table 1, below.

TABLE 1

| Equipment | Description |
|---|---|
| D4 102 | A multiplexer/de-multiplexer unit for combining multiple digital lines (e.g., DS0s) 104 into a digital trunk (e.g., DS1) 106; |
| ORB 108 | An office repeater bay that receives and amplifies a DS1 signal 110; |
| M1-3 112 | A multiplexer/de-multiplexer unit for combining multiple DS1s 114 into a DS3 116; |
| MFT1 118 | A 2-wire metallic frame terminal for amplifying and/or balancing an analog or digital line 120; |
| MFT2 122 | A 4-wire metallic frame terminal for amplifying and/or balancing an analog or digital line 124; |
| SMAS 126 | A port for allowing access and/or test of a digital line 128; |
| Switch 130 | A trunk-side switch. Examples include a tandem (TMD) or plain old telephone (POTS) system; |
| DCS1-0 132 | A narrow band electronic cross-connect system that reconfigures a DS0 134; |
| DCS3-1 136 | A wide band electronic cross-connect system that reconfigures a DS1 138; |
| DCS3-3 140 | A broad band electronic cross-connect system that reconfigures a DS3 142; |
| ATM 144 | An asynchronous transfer mode switch for trunks 146; |
| D8L 148 | A digital subscriber line splitter 148 for servicing a DSL line 150. |

In the present example, it is desired to allow a user such as a network engineer to monitor and review one or more of the pieces of equipment of the IOF 100.

Software Description

Referring now to FIG. 4, a rule based capacity management computer program 200 can be used for creating reviews of various equipment in the IOF 100. The computer program 200 may be performed by a single component of the monitoring system 20 of FIG. 2, or may have different aspects distributed throughout various processing platforms. In the present embodiment, the computer program 200 is performed by the file server 32.

The computer program 200 includes a presentation layer 202, a business layer 204, and a data layer 206. The presentation layer 202 provides, in the present embodiment, the graphical user interface ("GUI") to the user (e.g., the network engineer). The GUI allows the user to set specific parameters for specific reviews and forecasts, and also presents the data from the reviews and forecasts. The presentation layer 202 may have many different components, such as listed in Table 2 below.

TABLE 2

| Component | Description |
|---|---|
| Review Monitor | A table screen that shows how many reviews a user has created. It retrieves this information from the server. It so provides a history of the reviews. |
| User Preference | This describes user preferences, such as a location and responsibility, color of charts, and so forth. |
| D&C Chart | A graph of demand vs. capacity for a particular location. |
| Chart Properties | This allows customization of the D&C Chart. |
| Forecast and Pending Job | This is a report that allows the user to enter a single event forecasted demand and/or a published forecast. Also, the user can enter pending jobs that are not yet input to the inventory system 208. |
| Review Details | This provides parameters defined for the review. It identifies a time frame (e.g., monthly), forecast vs. trend, warning levels, etc. |
| Standard Configuration Selection | This identifies standard equipment configurations for the equipment. This is used to help determine the best combination of equipment, since the equipment configuration is fairly complex. |
| Local Office Profile | This assists how the system automatically selects equipment for a specific office. |
| Job Justification Story | This is a word-processing document automatically created by the system for specific vendors. (e.g., RBOCs). |
| Rule Based Editor | This allows the user (or an administrator) to edit rules. For example, if an equipment type changes to a new model, different rules (with different parameters) may apply. |

The data layer 206 includes a database of the raw data for the reviews and forecasts. The raw data comes from an inventory control system 208, such as the TIRKS system discussed above, using conventional techniques. In addition, the data layer 206 includes the rules that have either been predefined or defined by the network engineer. The rules define such things as specific configurations of pieces of equipment, typical equipment performance parameters, equipment endurance estimations, and so forth. An exemplary group of rules is provided in Table 3, below.

TABLE 3

| Rule |
|---|
| D4s come in groups of eight. |
| D4s can handle x amount of capacity. |
| D4s last for 2 years. |
| Each D4 is 7 feet tall. |

The business layer 204 serves as the engine between the presentation layer 202 and the data layer 206. In the present embodiment, the business layer 204 can 10 predict future capacity situations in one or more pieces of equipment being reviewed, and can predict exhaust conditions among the pieces of equipment. The business layer 204 may have many different components, such as listed in Table 4, below.

TABLE 4

| Component | Description |
| --- | --- |
| Review Database | This accesses the inventory system 208 (TIRKS) |
| Inference Engine | This is an artificial intelligence engine that performs the analysis, including the material for the D&C chart. |
| Job Justification Story | This creates the job justification story of Table 2 from the data layer 206. |
| Detect Equipment Exhaust | This identifies equipment exhaust conditions, from the Inference Engine |
| Generate D&C Chart | This creates the D&C Chart of Table 2 from the data layer 206. |
| Select Standard Configuration | This selects the appropriate standard configuration for the review. |
| Distribution | This distributes the results. For example, an email can be sent to the user responsive predetermined "alarm" conditions. |

Referring now to FIG. 5, the computer program 200 begins execution at step 250, where the network engineer defines a review. The engineer can define the review by selecting one or more pieces of equipment, and various parameters for the equipment. The engineer can also used predefined rules, or modify rules as desired.

At step 252, data relevant for the review is tracked. In the present embodiment, the data may be acquired by the TIRKS inventory system 208. The data is provided in a raw format. This data acquisition may occur over repeated intervals for a time span specified at step 250.

At step 254, the data is analyzed. The analysis is based on the previously provided rules. For example, the data can be accumulated in a predetermined manner, such as is required by a job justification story.

Referring also to FIG. 6, in one embodiment, the data can be analyzed using an inference engine 300 to perform certain forecasts. For example, a prediction that the system under review will "exhaust" at a certain point in the future can be made. Execution of the inference engine 300 begins at step 302 where the data acquired at step 252 (FIG. 5) is loaded. This data represents actual equipment status. At step 304, the rule base is searched for a match. If the equipment matches a rule, then execution proceeds to step 306 where the rule is "fired." A rule is fired by performing "consequences" of the rule. A consequence is an action or a conclusion that can be made from the particular piece of equipment. At step 308, the consequence is provided for further analysis or reporting. Upon completion of step 308, or upon a negative determination at step 304, execution returns to step 302 until all of the data has been parsed (determined at step 309). As a result, each piece of data that has a corresponding rule will be fired on.

Referring again to FIG. 5, at step 256, the data is organized into a predetermined format and reported. The data may be reported as a job justification story, in an email notification, and/or in various graphs. Since, in some embodiments, the program 200 may perform over an extended period of time, the data reporting step 256 may be repeated throughout the period of time, in similar or different reporting formats.

Exemplary Screen Shots

The program 200 can also be described by showing several different images from the presentation layer 202. Since the images are dynamic and interactive, screen shots of the images will be further discussed. The screen shots relate to exemplary situations of a node in the network, such as the IOF of FIG. 3. It is understood that different portions of the screen shots can be combined in various manners to produce even more examples of the graphical user interface.

Figure 7:
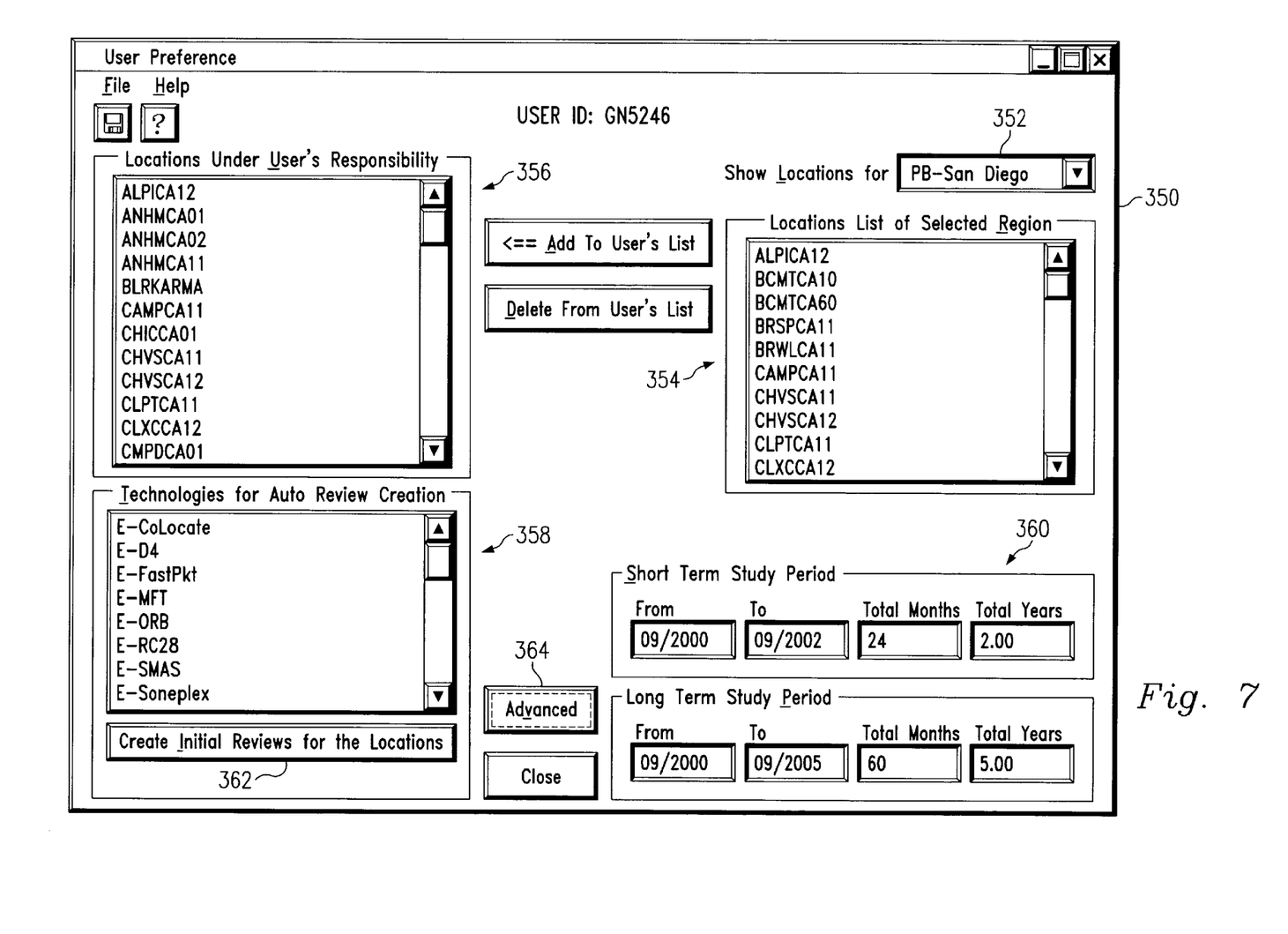
FIGS. 7–10, 12–14 provide screen shots, such as from the computer system of FIG. 2, that illustrate different embodiments of the present invention.

Referring now to FIG. 7, a screen shot 350 illustrates one example of the user preference component of Table 2, above. The screen 350 includes a menu 352 that allows a user to select one or more possible regions (or "engineering areas") for review. Once a region is selected, a window 354 lists all the IOF's for the engineering areas. The user can then transfer specific IOF's to a window 356 for further review. Specific technologies can be selected in a window 358 and a time period for review can be determined in a window 360. Once the selections are made, an initial review can be automatically created with a button 362 to create a review for the selected offices and technologies. Further customization is possible by activating a button 364. This allows the user to choose "Review Monitor" and "D & C Chart" components as well as selecting an engineering function of the user.

Figure 8:
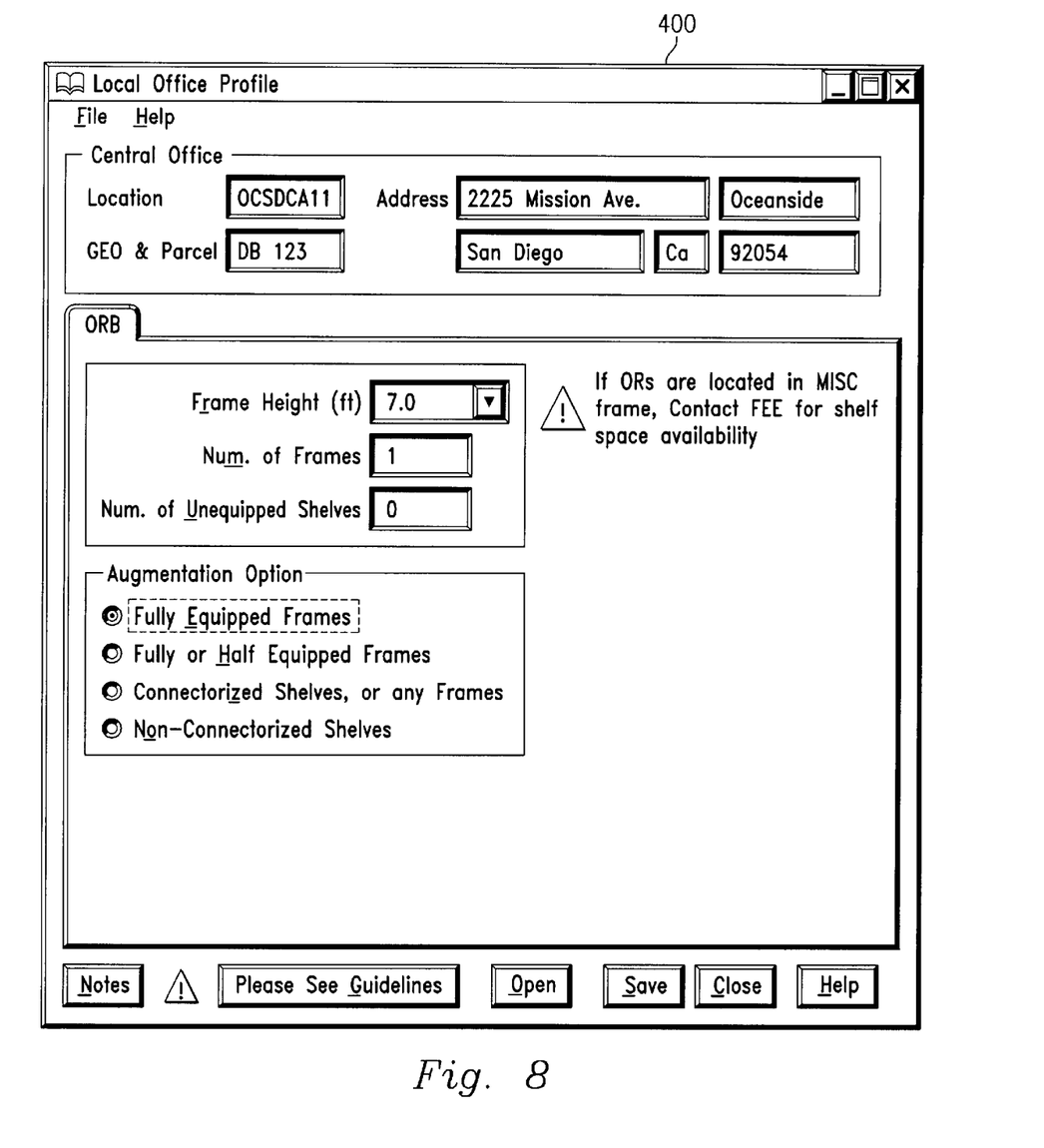

Referring also to FIG. 8, one advanced option is to modify a local office profile with a screen 400. In the present example, the configuration of an office repeater bay for a particular IOF (e.g. IOF 100 of FIG. 3) is to be modified (e.g., ORB 108). Each IOF can have different frame heights, and hold different quantities of equipment. As such, the user can change certain parameters of the equipment in the IOF.

Figure 9:
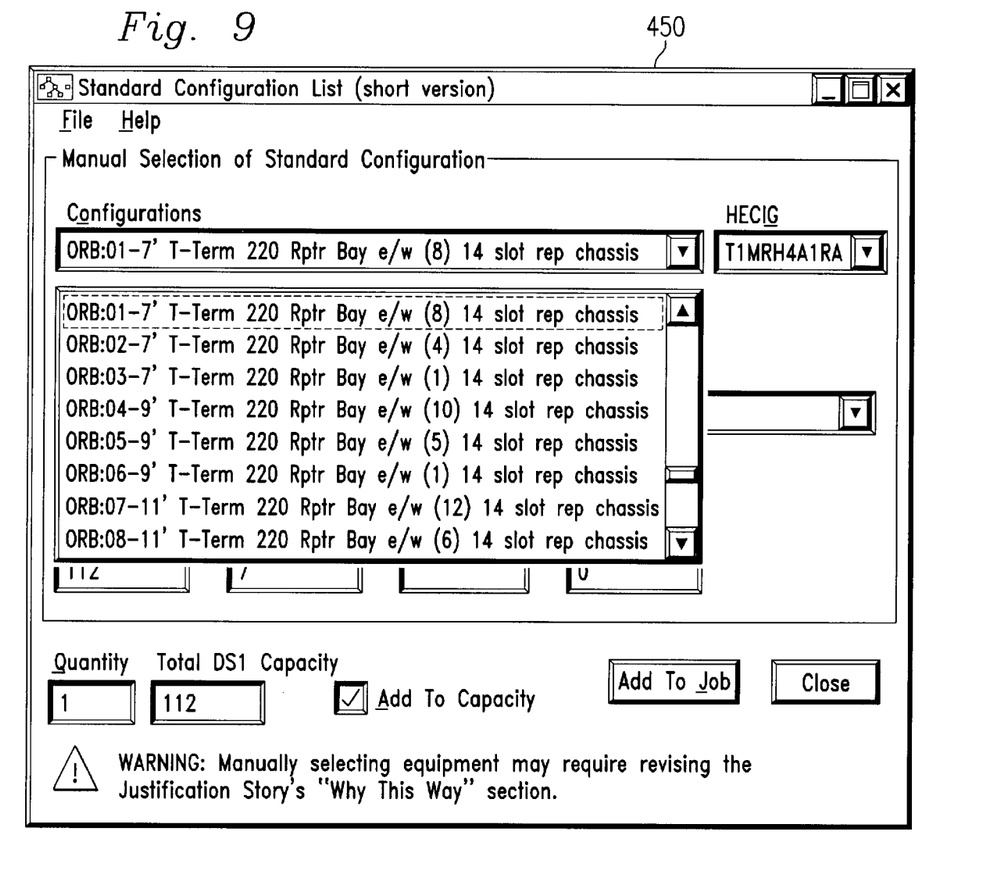

Referring also to FIG. 9, a standard configuration list 450 may be used to select a standard configuration for a specific IOF. In the present embodiment, the standard configurations are fixed and created by engineering boards and/or various equipment vendors.

Figure 10:
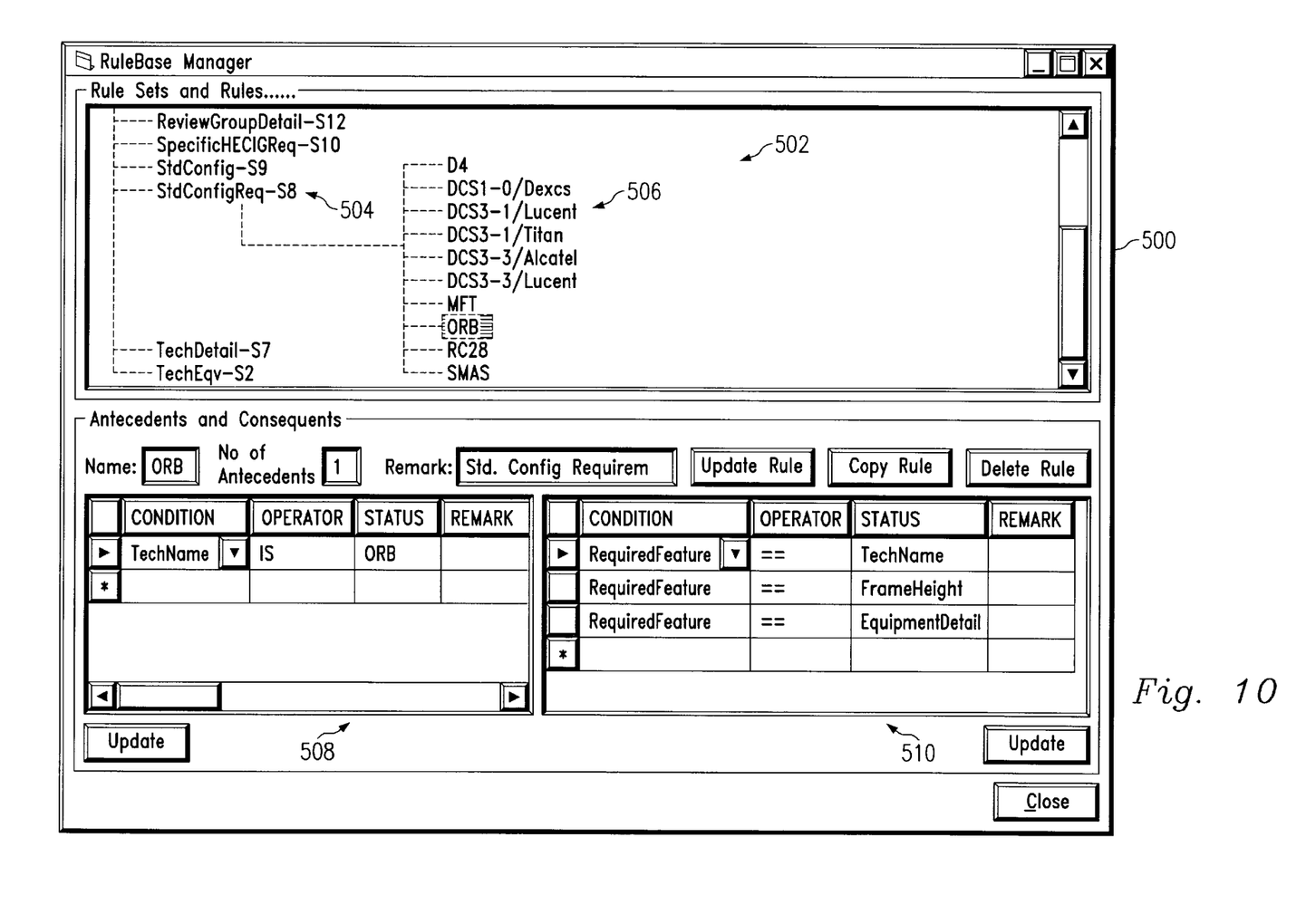
Figure 11:
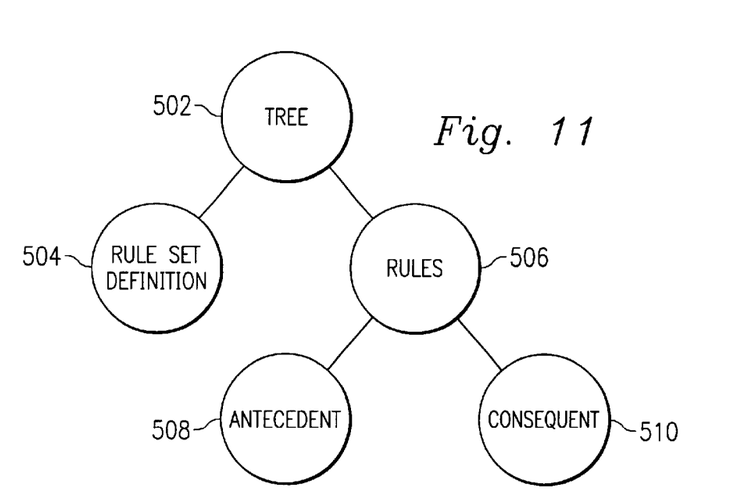
FIG. 11 provides a graphical illustration of one embodiment of a rule tree for use by the software program of FIGS. 4–5.

Referring to FIGS. 10 and 11, a rule-base manager screen 500 allows the user to define rules for the rule based capacity management program 200. The screen 500 allows the user to embed or encode business logic, company guidelines, and equipment properties into the rules.

The rules are organized in a tree structure 502. One part of the tree structure 502 is a rule set 504. The rule set 504 categorizes the different "areas" of rules, which identify where the rules will be applied and helps the inference engine 300 (FIG. 6) to identify which rule set to apply when the need arises. In the example of FIG. 10, a standard configuration rule set requirement ("StdConfigReq-S8") is one group of rules for a specific IOF. Other examples of rule sets would include a group of rules directed to timing requirements, sizing requirements, and so forth.

Another part of the tree structure 502 are rules 506. Each rule includes an antecedent 508 and a consequent 510. The antecedent 508 serves as a precondition for the rule, and the consequent 510 serves as a conclusion for the rule. In the example of FIG. 10, the rule office repeater bay ("ORB") has one antecedent basis of:

TechName is ORB.

If this antecedent is met, the following three consequents are made:

Required Feature==TechName;
Required Feature==FrameHeight;
Required Feature==EquipmentDetail.

The consequents dictate a name, frame height, and equipment detail description for the ORB.

By having the above described tree structure, a great deal of flexibility is provided to the rules. For example, if later on the user wants to change the rules for the ORB, the consequent or antecedent can be readily modified. As a result, changes to equipment, company guidelines, or other rule logic does not require the user to rebuild the entire rule based capacity management program 200.

Figure 12:
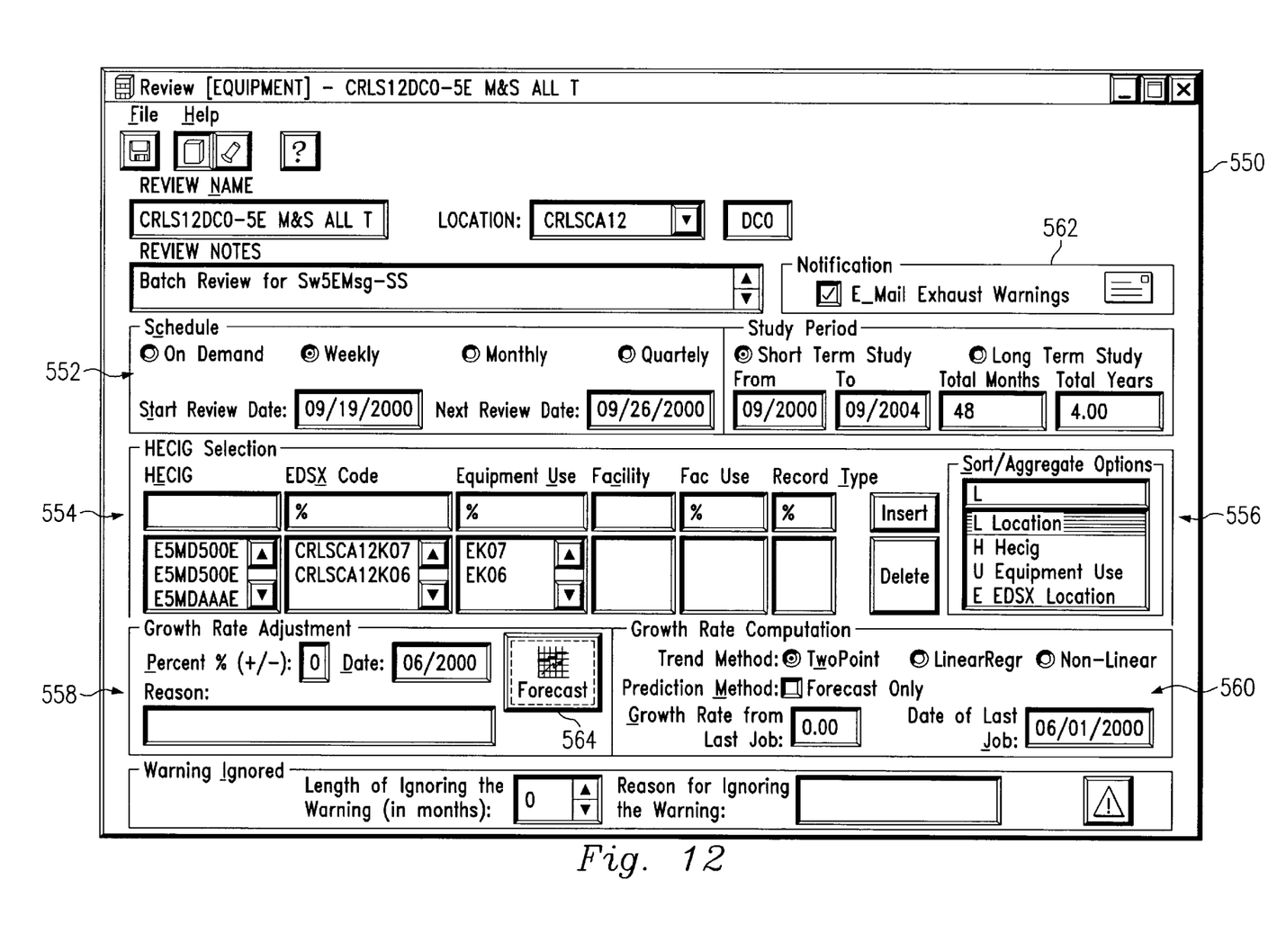

Referring now to FIG. 12, another way to create a review is with the review monitor component of Table 2, above. A screen shot 550 illustrates one example of the review monitor component. The screen 550 creates a review (e.g., review "CRLS12DCO-5E M&S ALL T") for a particular piece of equipment (e.g., "DC0") of an IOF (e.g., central office "CRLSCA12"). A window 552 allows the user to schedule the review and a window 554 allows the user to select a certain piece of equipment with a HECIG code. The HECIG code identifies a human equipment common interface (HECIG) value. All the HECIGs that were included are shown, and can be sorted by a function 556.

A window 558 allows the user to modify the growth rate of the IOF, if certain conditions are known. For example, a population area served by the IOF can be under relatively rapid expansion. A window 560 can allow different growth rate computation methods. A notification window 562 can be used to activate email notification of the user when certain conditions are met. A forecast button 564 causes a forecast and pending jobs window to appear, discussed below.

Figure 13:
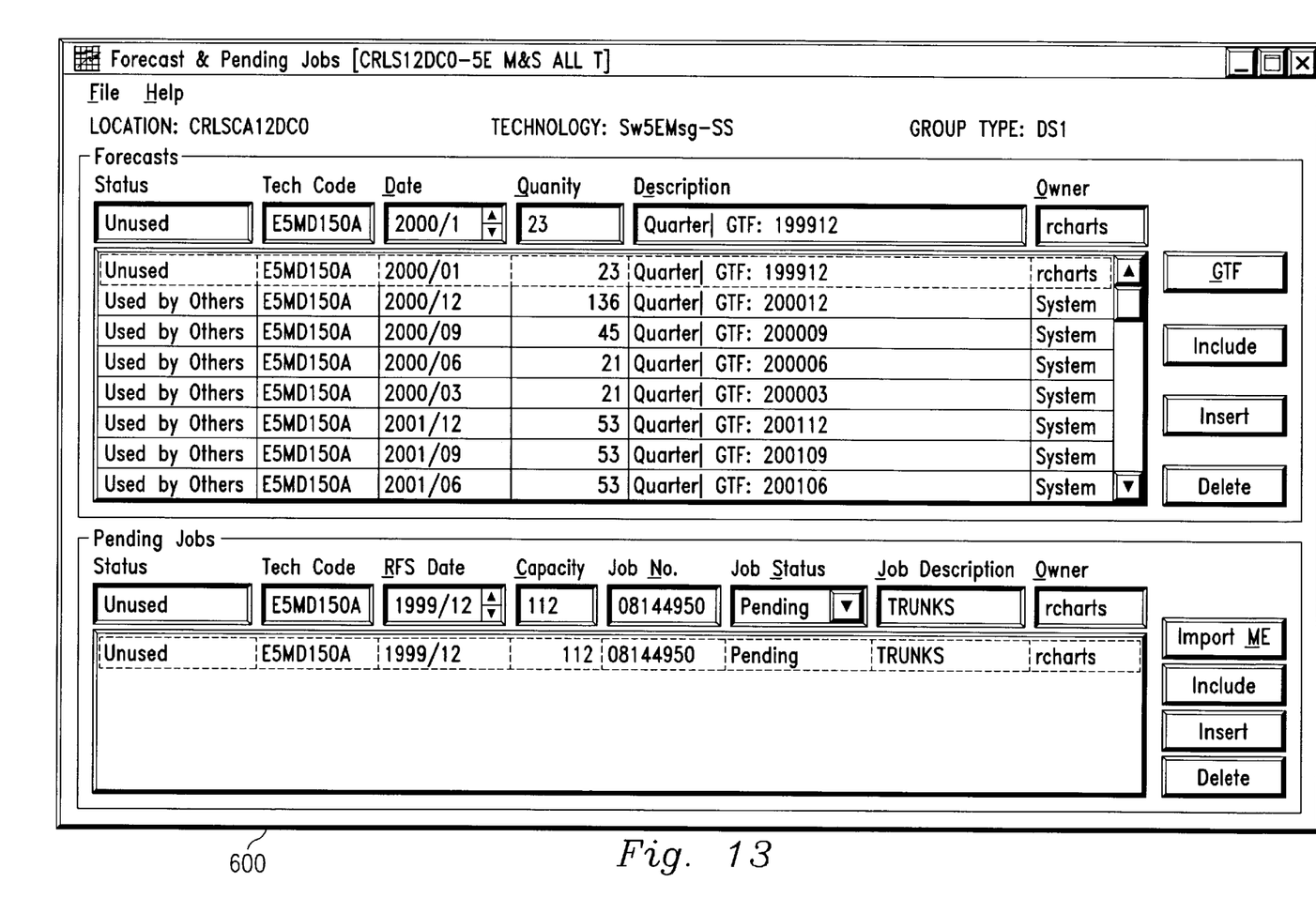

Referring to FIG. 13, a forecast and pending job screen 600 is used to illustrate different forecasts and jobs that make up a review. The screen 600 can be divided into two different sections: a forecast section 602 and a pending jobs section 604. The forecast section 602 indicates the status of a job (e.g., whether the current job is being used), the HECIG code of the exact equipment type, date and quantity for the forecast, and a description of what is causing the demand for forecast. The user (acting as the "owner") may create a forecast, may "insert" it in the review list, and may "include" or use the forecast in the review. The pending jobs section 604 identifies various equipment modifications that are being performed.

Figure 14:
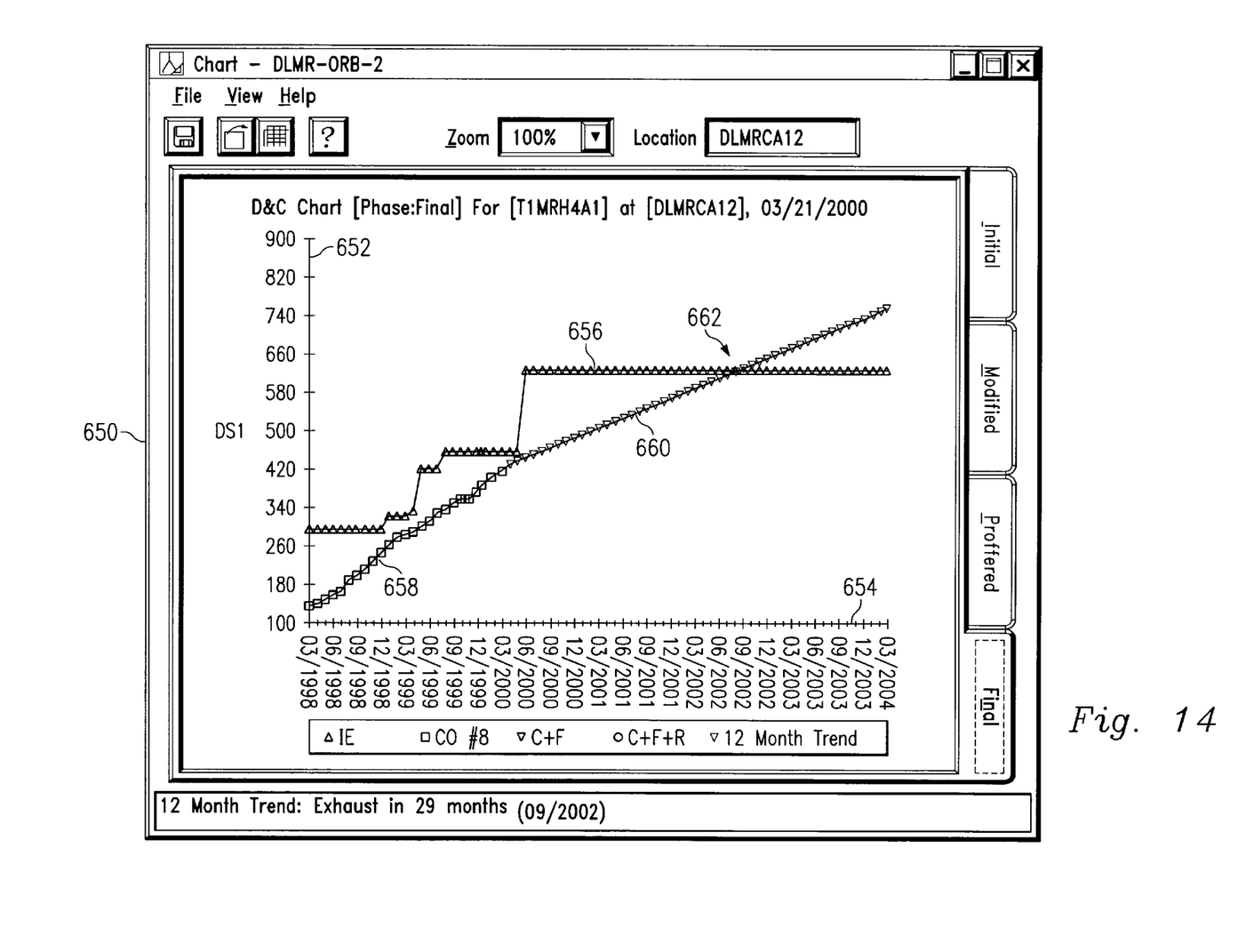

Referring now to FIG. 14, one type of forecast is a D&C chart, as discussed in Table 2, above. A screen shot 650 illustrates one example of a D&C chart. In continuance with the present example, the D&C chart 650 analyses an office repeater bay ("ORB"). A vertical axis 652 identifies a bit rate level (e.g., DS1) for the ORB, and a horizontal axis 654 identifies time. A curve 656 identifies maximum capacity for the ORB. As can be seen, the maximum capacity has been increased at several times during the previous months, due to various enhancements to the ORB.

A curve 658 identifies working or consumed capacity of the ORB up until the time of the last review. In the present case, the consumed capacity 658 has always been below the maximum 656. A curve 660 identifies a projected trend for the consumed capacity 658. As can be seen, the projected trend 660 intersects the maximum capacity 656 at a point 662. In the present embodiment, the point 662 identifies a date of September 2002. This identifies to the user that an exhaust condition will probably occur at that date. The user may then respond appropriately, such as by increasing the maximum capacity for the ORB. The user may have requested email notification at a predetermined time before the point 662 (such as through the window 562 of FIG. 12). Since the review is performed for a period of time, more data will become available for analysis and a more accurate intersection point can be determined.

Conclusion

Thus, there is disclosed a system and method for monitoring and analyzing one or more pieces of telecommunication network equipment via a rule based system. In some embodiments, the system and method allow a user to quickly determine the status of the equipment. The system may be interactive, and can quickly provide specific information without providing superfluous or unnecessary information to the user. In addition, implementations of the various embodiments described above can be performed very quickly, as compared to conventional techniques, such as running a TIRKS online report facility.

While the invention has been particularly shown and described with reference to the preferred embodiment thereof, it will be understood by those skilled in the art that various changes in form and detail may be made therein without departing form the spirit and scope of the invention.

What is claimed is:

1. A computer program for monitoring equipment in a telecommunications network, the computer program comprising:

a presentation layer for providing a graphical user interface to a user of the program, the presentation layer capable of receiving one or more rules from the user and for providing one or more analytical reports of the equipment based on the rules;

a data layer for storing a plurality of rules, including the rules received from the user, and for connecting to an inventory system for providing raw data related to the at least one piece of equipment;

a business layer interfacing between the presentation layer and the data layer, the business layer creating the analytical reports responsive to the rules and the raw data, wherein at least one of the analytical reports is in the form of a job justification story, the job justification story being according to a format determined by a regional bell operating company.

2. The computer program of claim 1 wherein the business layer includes an inference engine comprising instructions for:

retrieving the data from the data layer;

determining if a match exists between the data and one or more of the rules;

if a match exists, firing the rule on the data to produce an analysis; and formatting the analysis into the analytical reports.

3. The computer program of claim 1 wherein the graphical user interface of the presentation layer provides a display screen comprising:

a first interface portion for allowing the user to select the equipment;

a second interface portion for allowing the user to select a review period;

a third interface portion for allowing the user to select a configuration for the equipment.

4. The computer program of claim 3 wherein the third interface portion allows the user to select a configuration for the equipment from a list of predetermined possible configurations.

5. The computer program of claim 1 wherein the graphical user interface of the presentation layer provides a display screen comprising:

a first interface portion for allowing the user to select a rule from a rule tree according to a rule set definition, the rule comprising an antecedent and a consequent; and a second interface portion for allowing the user to modify either or both of the antecedent and the consequent of the selected rule.

6. The computer program of claim 1 wherein at least one of the analytical reports indicates a predicted exhaust condition.

7. The computer program of claim 6 further comprising a remote notification program interface for reporting at least one of the analytical reports to the user through an automatic email operation.

8. The computer program of claim 6 wherein the predicted exhaust condition is in the form of a demand and capacity chart.

9. The computer program of claim 6 wherein the predicted exhaust condition is determined through artificial intelligence.

10. The computer program of claim 1 wherein at least one of the analytical reports is in the form of a job justification story.

11. A method for monitoring equipment in an inter-office facility ("IOF") according to one or more rules, the method comprising:

providing a graphical user interface for selecting a configuration for the equipment from a list of predetermined possible configurations;

defining a review for the IOF, the review identifying a review interval, a notification preference, a plurality of rules, and the selected configuration of equipment;

retrieving data for the one or more components identified in the review;

analyzing the data by comparing the data to each rule, and if the data and rule match, creating a conclusion based on the rule and the data;

reporting the conclusion in a graphical format to a remotely accessible server.

12. The method of claim 11 wherein the conclusion is in the form of a job justification story, the job justification story being according to a format determined by a regional bell operating company.

13. The method of claim 11 wherein the step of identifying a plurality of rules comprises:

allowing a user to select a rule from a rule tree according to a rule set definition, the rule comprising an antecedent and a consequent; and allowing the user to modify either or both of the antecedent and the consequent of the selected rule.

14. The method of claim 11 wherein the conclusion indicates a predicted exhaust condition.

15. The method of claim 11 further comprising:

reporting the conclusion to a user through an automatic email operation.

16. A system for monitoring equipment in a telecommunications network, the system comprising:

a graphical user interface for allowing a user to select a monitor set, the monitor set including at least one of either a subset of the equipment, a review period, or a configuration for the equipment; the graphical user interface also for receiving one or more rules from the user and for providing one or more analytical reports of the equipment based on the rules and the monitor set;

a data server for storing a plurality of rules, including the rules received from the user, and for connecting to an inventory system for providing raw data related to the at least one piece of equipment;

a program for interfacing between the graphical user interface and the data server, the program creating the analytical reports responsive to the rules and the raw data.

17. The system of claim 16 further comprising:

an inference engine comprising instructions for retrieving the data from the data layer, determining if a match exists between the data and one or more of the rules, if a match exists, firing the rule on the data to produce an analysis, and formatting the analysis into the analytical reports.

18. The system of claim 17 wherein at least one of the analytical reports is in the form of a job justification story, the job justification story being according to a format determined by a regional bell operating company.

19. The system of claim 16 wherein the graphical user interface allows the user to select the configuration for the equipment from a list of predetermined possible configurations.

20. The system of claim 16 wherein the graphical user interface of the presentation layer provides a display screen comprising:

means for allowing the user to select a rule from a rule tree according to a rule set definition, the rule comprising an antecedent and a consequent; and means for allowing the user to modify either or both of the antecedent and the consequent of the selected rule.

21. The system of claim 16 wherein at least one of the analytical reports indicates a predicted exhaust condition.

22. The system of claim 21 further comprising:

a remote user interface system for reporting at least one of the analytical reports to the user through a remote interface.

23. The system of claim 16 wherein the graphical user interface of the presentation layer provides a display screen comprising:

means for allowing the user to select the equipment;

means for allowing the user to select the review period; and means for allowing the user to select the configuration for the equipment.

* * * * *